(12) United States Patent
Basso et al.

(10) Patent No.: US 7,623,361 B2
(45) Date of Patent: Nov. 24, 2009

(54) POWER SUPPLY SOFT START CONTROLLER WITH NO OUTPUT VOLTAGE UNDERSHOOT WHEN TRANSITIONING FROM SKIP CYCLE MODE TO NORMAL MODE

(75) Inventors: Christophe Basso, Pibrac (FR); Jefferson W. Hall, Chandler, AZ (US); Petr Kadanka, Valasska Bystrice (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 418 days.

(21) Appl. No.: 11/573,708

(22) PCT Filed: Jul. 15, 2005

(86) PCT No.: PCT/US2005/024990
§ 371 (c)(1),
(2), (4) Date: Jun. 14, 2007

(87) PCT Pub. No.: WO2007/011332
PCT Pub. Date: Jan. 25, 2007

(65) Prior Publication Data
US 2008/0094048 A1    Apr. 24, 2008

(51) Int. Cl.
   *H02M 7/5375* (2006.01)
(52) U.S. Cl. .................... 363/49; 323/901
(58) Field of Classification Search .............. 323/901; 363/49
   See application file for complete search history.

(56) References Cited

U.S. PATENT DOCUMENTS

| 5,657,220 | A * | 8/1997 | Yan .................... 363/132 |
| 6,377,480 | B1 * | 4/2002 | Sase et al. ................. 363/49 |
| 6,969,977 | B1 * | 11/2005 | Smith ..................... 323/222 |
| 7,019,507 | B1 * | 3/2006 | Dittmer et al. ............ 323/284 |
| 7,045,992 | B1 * | 5/2006 | Silva et al. ............... 323/222 |
| 7,106,036 | B1 * | 9/2006 | Collins .................... 323/282 |
| 7,541,795 | B1 * | 6/2009 | Smith et al. .............. 323/285 |
| 7,573,252 | B1 * | 8/2009 | Griesert .................. 323/315 |
| 2008/0094048 | A1 * | 4/2008 | Basso et al. ............. 323/283 |
| 2009/0115379 | A1 * | 5/2009 | Al-Shyoukh ............ 323/238 |
| 2009/0143032 | A1 * | 6/2009 | Ojanen et al. ........... 455/127.1 |

\* cited by examiner

*Primary Examiner*—Jeffrey L Sterrett
(74) *Attorney, Agent, or Firm*—Robert F. Hightower

(57) ABSTRACT

In one embodiment, a power supply controller is configured to reset or override a soft-start reference signal responsively to the output voltage decreasing to a value that is less than a desired regulated value of the output voltage.

20 Claims, 2 Drawing Sheets

POWER SUPPLY SOFT START CONTROLLER WITH NO OUTPUT VOLTAGE UNDERSHOOT WHEN TRANSITIONING FROM SKIP CYCLE MODE TO NORMAL MODE

BACKGROUND OF THE INVENTION

The present invention relates, in general, to electronics, and more particularly, to methods of forming semiconductor devices and structure.

In the past, the semiconductor industry utilized various methods and structures to form pulse width modulated (PWM) power supply controllers that were used to regulate an output voltage of a power supply system. Most PWM power supply controllers included a soft-start function that, during the initial startup, slowly increased the maximum current that was used to regulate the output voltage. Another function that was generally included in most PWM power supply controllers was a burst mode or skip cycle mode. The burst mode or skip cycle mode was used to decrease power dissipation and improve voltage regulation when the power requirements of load decreased to a light level. One example of such a power supply controller was the NCP1239 that was available from ON semiconductor of Phoenix Arizona.

In most cases, when the power supply controller transitioned from the skip cycle mode to the normal operating mode, the soft-start function was re-enabled to slowly increase the maximum current that was supplied to the load. In some cases, during the transition the output voltage generally would undershoot and take a long time to reach the desired regulated output voltage value.

Accordingly, it is desirable to have a power supply controller that has both a soft-start function and a skip cycle function and that does not undershoot the output voltage when transitioning from the skip cycle operating mode to the normal operating mode.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

Figure 1:
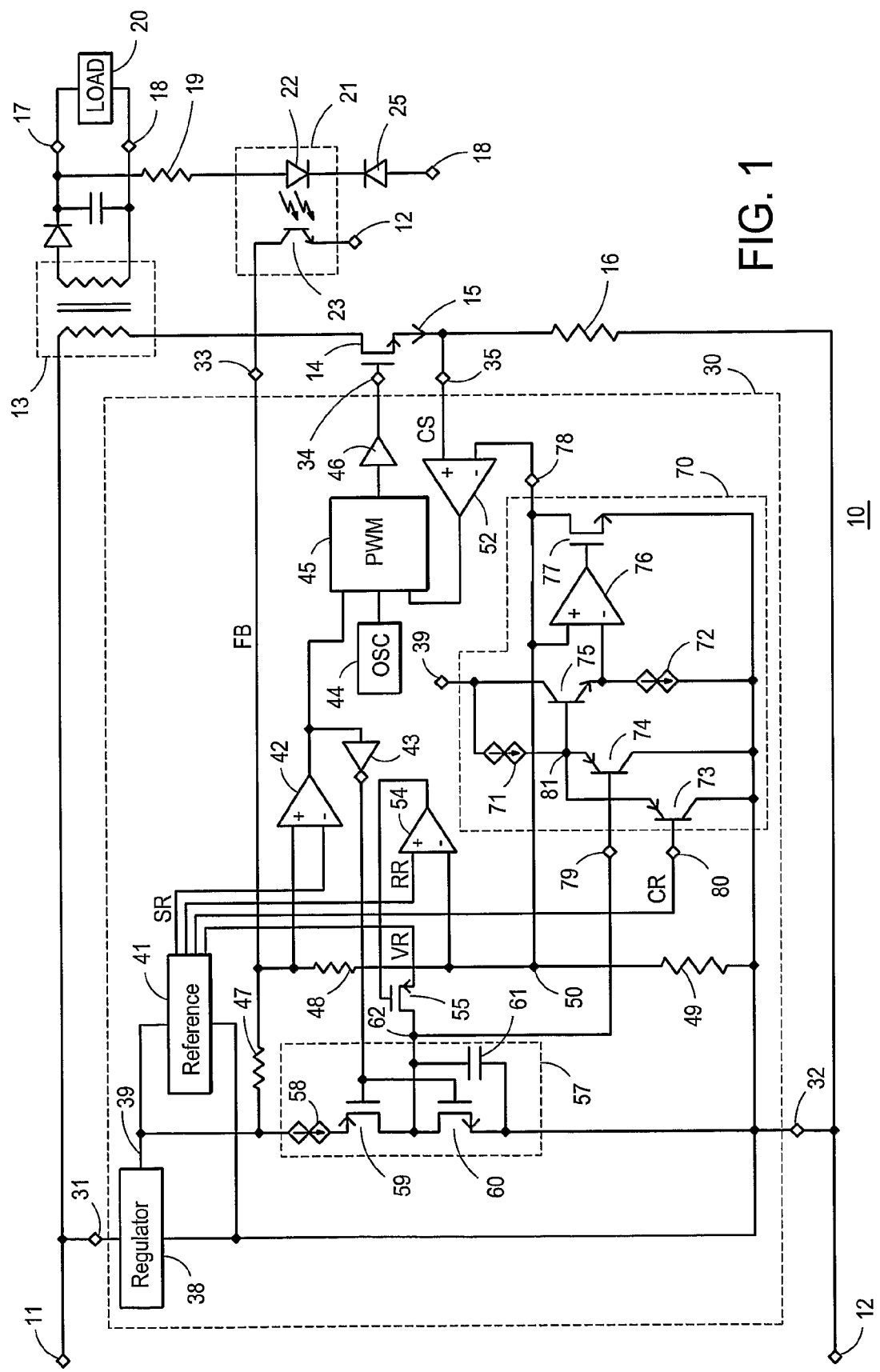
FIG. 1 schematically illustrates an embodiment of a portion of a power supply control system that includes a PWM power supply controller in accordance with the present invention.

FIG. 1 schematically illustrates an embodiment of a portion of a power supply system 10 that includes a power supply controller 30. System 10 is configured to receive an input voltage between a voltage input terminal 11 and a voltage return terminal 12 and form an output voltage between a voltage output 17 and a voltage return 18. A load 20 generally is coupled to receive the output voltage and receive a load current from output 17. The voltage applied between terminals 11 and 12 generally is a rectified ac voltage such as a rectified sine-wave or may be a dc voltage. System 10 may also include a transformer 13 that has a primary side and a secondary side, a power switch preferably implemented as a power transistor 14 that is connected to control a current 15 that flows through the primary side of transformer 13 and transistor 14, and a current sense resistor 16 that forms a current sense (CS) signal that is representative of current 15. Current 15 is represented by an arrow. Controller 30 receives the current sense (CS) signal on a current sense input 35. A feedback network of system 10 may include an optical coupler 21, a voltage reference device 25, and a feedback resistor 19. Voltage reference device 25 typically is a device that can form a precision reference voltage such as a shunt regulator. Device 25 generally functions as the output voltage error amplifier for system 10. One suitable shunt regulator is a TL431 that is available from ON semiconductor of Phoenix Arizona. Such shunt regulators and the error amplifier application thereof are well known to those skilled in the art. Optical coupler 21 includes a light emitting diode 22 and a photo-transistor 23 that are used to form a feedback (FB) signal that is representative of the value of the output voltage between output 17 and return 18. Controller 30 may include a pull-up resistor 47 that is utilized to pull-up the output of transistor 23 to facilitate forming the FB signal. Controller 30 receives the FB signal on a FB input 33. Such feedback networks and FB signals are well known to those skilled in the art. Those skilled in the art also understand that the feedback network may have other embodiments as long as it forms a FB signal that is representative of the output voltage. Controller 30 typically is formed on a semiconductor die which is assembled into a semiconductor package. In some embodiments, transistor 14 may be formed as a portion of controller 30. As those skilled in the art will appreciate, some embodiments of controller 30 may include an error amplifier that replaces a portion of device 25.

Power supply controller 30 receives power between a power input 31 and a power return 32. Typically, input 31 is connected to terminal 11 and return 32 is connected to terminal 12. Controller 30 generally includes an internal voltage regulator or regulator 38 that receives the voltage from input 31 and forms an internal operating voltage on an output 39 that is used for operating elements of controller 30. A reference voltage generator or reference 41 receives the internal operating voltage from output 39 and generates reference voltages that are used for operating controller 30. As will be seen further hereinafter, reference 41 forms a clamp reference (CR) signal on a clamp output, a skip cycle reference (SR) signal on a skip cycle output, a reset reference (RR) signal on a reset output, and an override reference (VR) signal on an override output. Controller 30 also typically includes an oscillator 44, a PWM control section or PWM 45, a transistor driver 46, a current sense comparator 52, a shunt regulator clamp 70, a soft-start reference signal generator 57, a skip cycle comparator 42, an inverter 43, and a soft-start override section that preferably includes a soft-start comparator 54 and an override switch implemented as a transistor 55. A resistor divider formed by resistors 48 and 49 divide the FB signal down to a reduced FB signal on a node 50 that has a level compatible with clamp 70 and the output of generator 57. The reduced FB signal is representative of the output voltage.

PWM 45 is a PWM control circuit that is used to generate a PWM control signal that is utilized for controlling transistor 14 in order to regulate the value of the output voltage between output 17 and return 18. PWM 45 can be any one of a variety of PWM control circuits including a voltage mode or current mode or leading edge or trailing edge PWM controller, or a hysteretic controller. Typically, PWM 45 includes logic to implement the skip cycle function. One example of a PWM control circuit that includes a skip cycle function is disclosed in U.S. Pat. No. 6,597,221 issued to Jefferson Hall et al on Jul. 22, 2003 which is hereby incorporated herein by reference. Driver 46 receives the PWM control signal from PWM 45 and forms a PWM drive signal on a PWM drive output 34. Driver 46 is formed to have sufficient drive to control a power switch such as transistor 14.

In the preferred embodiment, soft-start reference generator 57 selectively forms a linearly increasing soft-start reference signal on an output 62 of generator 57. In order to form the linearly increasing soft-start reference signal, the preferred embodiment of generator 57 includes a current source 58, a first switch implemented as a first transistor 59, a second switch implemented as a second transistor 60, and a capacitor 61. When the output of inverter 43 is low, transistor 60 is disabled and has no effect, and transistor 59 is enabled to couple current source 58 to capacitor 61 thereby charging capacitor 61 and forming the linearly increasing soft-start reference signal. When the output of inverter 43 is high, transistor 59 is disabled and transistor 60 is enabled to discharge capacitor 61. Those skilled in the art will appreciate that generator 57 may have other embodiments as long as it selectively forms a soft-start reference signal and will also appreciate that the soft-start reference signal may have other waveshapes in other embodiments.

As will be seen further hereinafter, the soft-start control section, that preferably includes comparator 54 and transistor 55, is configured to selectively override a value of the soft-start reference signal responsively to load 20 requiring a greater load current and decreasing the value of the output voltage to a value that is less than the regulated value and less than the value that initiates the skip cycle mode. In the preferred embodiment illustrated in FIG. 1, the soft-start control section overrides the value of the soft-start reference signal by changing it to a different value, as will be seen further hereinafter.

Shunt regulator clamp 70 preferably includes ORing transistors 73 and 74, a first current source 71, a buffer transistor 75, a second current source 72, an amplifier 76, an output transistor 77, and an output 78. Clamp 70 receives the soft-start reference signal on an input 79 and receives the clamp reference (CR) signal on an input 80. Transistors 73 and 74 logically "OR" the signals together and the signal having the lower value is formed on a node 81. Follower connected transistor 75 couples the signal from node 81, minus the Vbe of transistor 75, to the inverting input of amplifier 76. The reduced FB signal from node 50 is received by the non-inverting input of amplifier 76. If generator 57 is reset and capacitor 61 is discharged, input 79 is near the value of the voltage on return 32 which enables transistor 74 to pull node 81 to substantially the voltage of return 32 plus the Vbe voltage drop of transistor 74 and sink the current from source 71. Thus, amplifier 76 and transistor 77 force output 78 to the voltage on input 79. As capacitor 61 charges, output 78 follows the value of the soft-start reference signal until it reaches the clamp reference (CR) signal on input 80. Note that node 78 follows input 79 but is shifted in value by the Vbe of transistor 74. Once capacitor 61 charges to the value of the CR signal, output 78 follows the reduced FB signal received on the non-inverting input of amplifier 76. As capacitor 61 continues to charge past the CR signal, the soft-start reference signal has no effect on clamp 70. Such clamp circuits and the operation thereof are well known to those skilled in the art.

PWM 45 forms the PWM control signal to control transistor 14. In normal operation, capacitor 61 is charged to a value that is greater than the CR signal, thus, the soft-start reference signal does not affect the operation of controller 30 and PWM 45 regulates the output voltage to the regulated value. Oscillator 44 typically is a fixed frequency oscillator that supplies a clock signal to PWM 45 that is used for controlling the frequency of the PWM control signal that is generated by PWM 45. Current sense comparator 52 receives the CS signal and forces the output of comparator 52 high if the CS signal is greater than the current sense reference signal that is received from clamp 70. The high from comparator 52 is used to disable the PWM control signal, thus, disable transistor 14. The next edge of the clock signal from oscillator 44 starts another cycle to regulate the output voltage substantially to the regulated value. Such operation is commonly referred to as current mode control and is well known by those skilled in the art.

If the value of the current required by load 20 decreases, the value of the output voltage may increase to a first value that is greater than the regulated value. Controller 30 is configured to detect the first value and cause controller 30 to begin operating in the skip cycle mode. If the value of the output voltage increases to the first value, the value of the FB signal correspondingly decreases. If the FB signal decreases below the value of the skip cycle reference (SR) signal, the output of skip cycle comparator 42 goes low to disable the PWM control signal and start the skip cycle operating mode. In the skip cycle mode, PWM 45 forms a series of short bursts of pulses that supply enough current to maintain the output voltage at substantially the regulated value. Those skilled in the art will appreciate that in the skip cycle mode the output voltage typically varies some amount around the regulated value and may vary between the regulated value and the first value. As controller 30 enters the skip cycle mode of operation, controller 30 also uses the soft-start reference signal to limit the peak value of current 15 during an initial portion of the skip cycle mode after the output of comparator 42 goes high. The high from comparator 42 forces the output of inverter 43 low thereby disabling transistor 60 and enabling transistor 59 to begin charging capacitor 61 and form the linearly increasing ramp signal on output 62. As long as the soft-start reference signal on output 62 is less than the clamp reference (CR) signal or less than the reduced FB signal, the current sense reference signal an output 78 follows the soft-start reference signal. The linearly increasing value of the current sense reference signal limits the peak value of current 15 that controller 30 allows to flow through transistor 14. Once capacitor 61 charges to a value that is no less than the lower of the CR signal or the reduced FB signal, clamp 70 applies the reduced FB signal from node 50 to output 78 which facilitates controller 30 using the value of the output voltage to control the peak value of current 15.

During the initial phase of the skip cycle mode while the soft-start reference signal is less than the CR signal, it is possible that load 20 may change state and require a larger load current than can be supplied in the skip cycle mode due to the current limitation resulting from the soft-start reference signal. In the past, prior art power supply controllers continued using the soft-start reference signal to limit the peak value of current through transistor 14 even though load 20 required a larger load current. Consequently, the value of the output voltage would decrease and could not be maintained substantially at the regulated value.

If load 20 changes state and requires an additional load current while the soft-start reference signal is less than the clamp reference (CR) signal, the value of the output voltage begins to decrease to a second value that is less than the regulated value. The lower output voltage value forces both the FB signal and the reduced FB signal on node 50 to correspondingly increase. If the reduced FB signal is increased to a value greater than the value of the reset reference (RR) signal, the output of comparator 54 is forced low thereby enabling transistor 55. Enabling transistor 55 couples the override reference (VR) signal to the soft-start reference signal on output 62 thereby rapidly increasing the value of the soft-start reference signal to a value that is greater than the value of the clamp reference (CR) signal. The VR signal from reference 41 functions as a voltage source and rapidly charges capacitor 61 to the value of the VR signal. Since the soft-start reference signal is now greater than the clamp reference (CR) signal, clamp 70 couples the reduced FB signal to output 78 thereby allowing controller 30 to use the reduced FB signal. Consequently, the output voltage is now used as the reference for controlling the peak value of current 15. Forcing the soft-start reference signal to the value that is greater than the clamp reference (CR) signal ensures that the current sense reference signal on output 78 is representative of the output voltage and ensures that the soft-start reference signal does not affect the operation of controller 30.

In order to implement this functionality for controller 30, a voltage input of regulator 38 is connected to input 31 and a voltage return of regulator 38 is connected to return 32. Output 39 of regulator 38 is connected to a voltage input of reference 41 which has a voltage return connected to return 32. Output 39 is also connected to a first terminal of resistor 47 and to a first terminal of source 58. A second terminal of resistor 47 is commonly connected to input 33, a first terminal of resistor 48, and the non-inverting input of comparator 42. An inverting input of comparator 42 is connected to the skip cycle output of reference 41. The output of comparator 42 is commonly connected to a first input of PWM 45 and an input of inverter 43. The output of inverter 43 is connected to the gate of transistors 59 and 60. A source of transistor 59 is connected to a second terminal of source 58. A drain of transistor 59 is commonly connected to output 62, a drain of transistor 60, a drain of transistor 55, and a first terminal of capacitor 61. A source of transistor 60 is commonly connected to a second terminal of capacitor 61 and to return 32. Output 62 is connected to input 79. A source of transistor 55 is connected to the override output of reference 41. A gate of transistor 55 is connected to the output of comparator 54. An inverting input of comparator 54 is commonly connected to node 50, a first terminal of resistor 49, a second terminal of resistor 48, a non-inverting input of amplifier 76, a drain of transistor 77, and output 78. A non-inverting input of comparator 54 is connected to the reset output of reference 41. A second terminal of resistor 49 is connected to return 32. A source of transistor 77 is connected to return 32 and a gate is connected to the output of amplifier 76. An inverting input of amplifier 76 is commonly connected to a first terminal of source 72 and to an emitter of transistor 75. A collector of transistor 75 is connected to output 39 and to a first terminal of source 71. A second terminal of source 71 is commonly connected to a base of transistor 75, an emitter of transistor 74, and an emitter transistor 73. A collector of transistor 73 is commonly connected to return 32, a collector of transistor 74, and a second terminal of source 72. A base of transistor 73 is connected to input 80 and to the clamp output of reference 41. A base of transistor 74 is connected to input 79. Output 78 is connected to an inverting input of comparator 52 which has a non-inverting input connected to input 35. The output of comparator 52 is connected to a second input of PWM 45. An output of oscillator 44 is connected to a third input of PWM 45. An output of PWM 45 is connected to an input of driver 46 which has an output connected to output 34.

Figure 2:
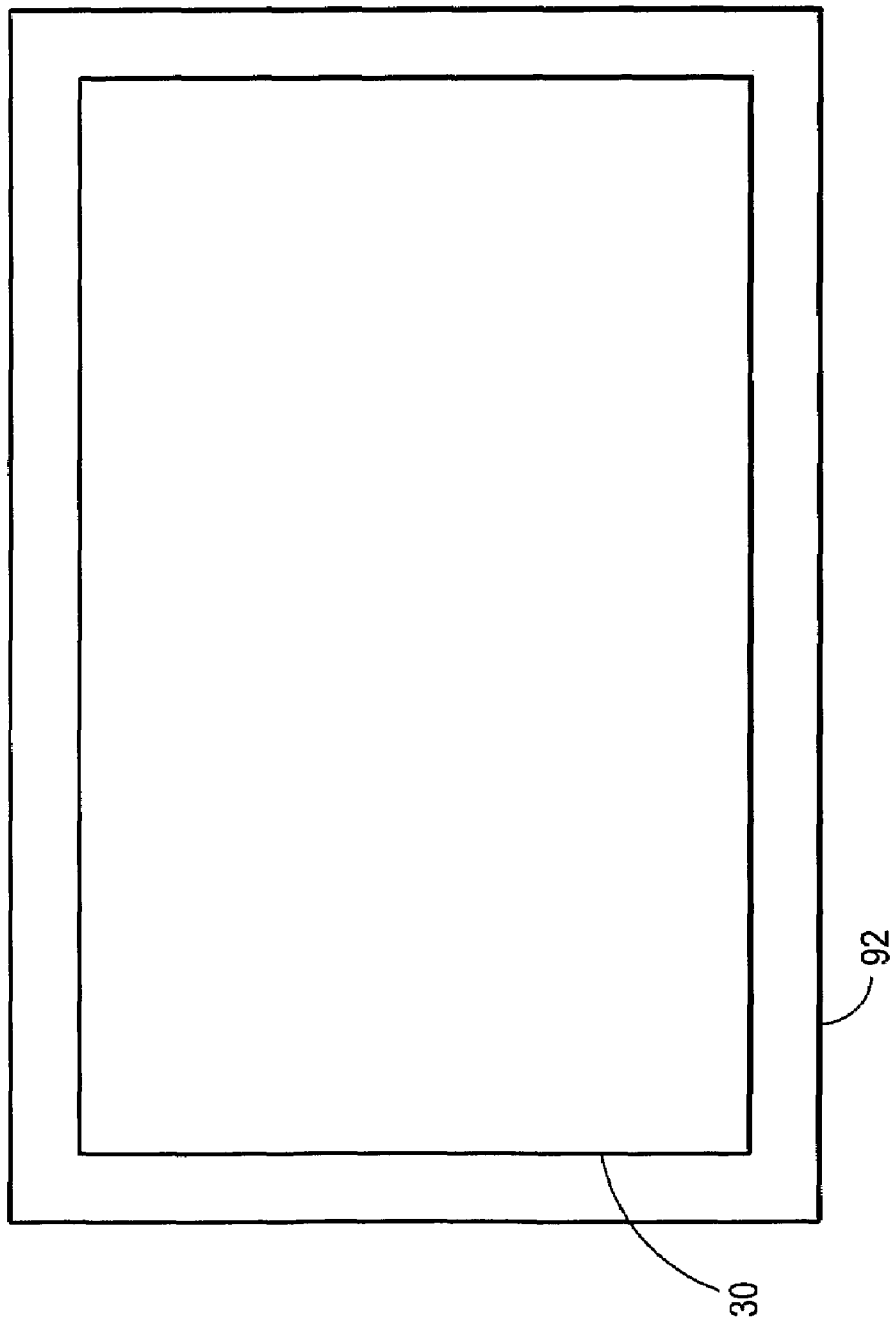
FIG. 2 schematically illustrates an enlarged plan view of a semiconductor device that includes the PWM power supply controller of FIG. 1 in accordance with the present invention.

FIG. 2 schematically illustrates an enlarged plan view of a portion of an embodiment of a semiconductor device 91 that is formed on a semiconductor die 92. Controller 30 is formed on die 92. Die 92 may also include other circuits that are not shown in FIG. 2 for simplicity of the drawing. Controller 30 and device 91 are formed on die 92 by semiconductor manufacturing techniques that are well known to those skilled in the art.

In view of all of the above, it is evident that a novel device and method is disclosed. Included, among other features, is forming a PWM controller to reset or override the soft-start reference signal responsively to the output voltage decreasing to a value that is less than the desired regulated value of the output voltage. Resetting or overriding the soft-start reference signal facilitates using the value of the output voltage to control the peak value of current that is used to control the value of the output voltage thereby improving the load transient response.

While the invention is described with specific preferred embodiments, it is evident that many alternatives and variations will be apparent to those skilled in the semiconductor arts. For example, controller 30 has been described for a particular flyback power supply system application but may also be used in applications for other power supply configurations. Further, the specific implementation illustrated and described for generator 57, clamp 70, and the soft-start override section are exemplary implementations and other implementations are possible. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A soft start circuit of a power supply controller comprising:
   a soft-start reference generator configured to form a soft-start reference signal responsively to an output voltage of a power supply system increasing to a first value that is greater than a regulated value of the output voltage; and
   a soft-start override circuit configured to receive a first signal that is representative of the output voltage and configured to override a value of the soft-start reference signal responsively to the output voltage decreasing to a second value that is less than the regulated value.

2. The soft start circuit of claim 1 wherein the soft-start reference generator is configured to generate a ramp signal as the soft-start reference signal.

3. The soft start circuit of claim 1 wherein the regulated value is less than the first value and greater than the second value.

4. The soft start circuit of claim 1 wherein the soft-start override circuit is configured to couple a voltage source to the soft-start reference signal responsively to the output voltage decreasing to the second value.

5. The soft start circuit of claim 1 wherein the soft-start override circuit includes a comparator coupled to receive the first signal and a first reference signal and form a control signal to cause the soft-start override circuit to change the value of the soft-start reference signal.

6. The soft start circuit of claim 5 wherein the control signal is coupled to switch a voltage source to an output of the soft-start reference generator.

7. The soft start circuit of claim 5 wherein the comparator has a first input coupled to receive the first signal, a second input coupled to receive the first reference signal from a reference voltage generator, and an output and further including a transistor having a control electrode coupled to the output of the comparator, a first current carrying electrode coupled to receive the first reference signal, and a second current carrying electrode coupled to an output of the soft-start reference generator.

8. The soft start circuit of claim 1 wherein a clamp circuit is configured to receive the soft-start reference signal and form a current sense reference signal that is used by a current sense comparator.

9. The soft start circuit of claim 1 wherein the power supply controller includes a PWM controller and a current sense comparator.

10. A method of forming a power supply controller comprising:
   configuring the power supply controller to form a drive signal to control a power switch to regulate an output voltage to a regulated value;
   configuring the power supply controller to receive a feedback signal that is representative of the output voltage;
   configuring the power supply controller to form a soft-start reference signal responsively to a first value of the output voltage that is greater than the regulated value; and
   configuring the power supply controller to inhibit the soft-start reference signal responsively to a second value of the output voltage that is less than the regulated value.

11. The method of claim 10 wherein configuring the power supply controller to inhibit the soft-start reference signal includes configuring the power supply controller to force the soft-start reference signal to a first reference value.

12. The method of claim 11 wherein configuring the power supply controller to force the soft-start reference signal to the first reference value includes configuring the power supply controller to force the soft-start reference signal to the first reference value in order to enable the power supply controller to regulate the output voltage to the regulated value.

13. The method of claim 11 wherein configuring the power supply controller to force the soft-start reference signal to the first reference value includes configuring a comparator to receive the feedback signal and a first reference signal and to enable a transistor to couple the first reference value to the soft-start reference signal responsively to the second value of the output voltage.

14. The method of claim 10 wherein configuring the power supply controller to form the soft-start reference signal responsively to the first value of the output voltage includes configuring the power supply controller to form the drive signal in bursts and use the soft-start reference signal to limit a peak value of current through the power switch.

15. The method of claim 14 wherein configuring the power supply controller to form the soft-start reference signal includes configuring the power supply controller to form a ramp shaped soft-start reference signal.

16. A power supply control method comprising:
   forming a drive signal to operate a power switch to regulate an output voltage of a power supply system to a regulated value;
   forming a soft-start reference signal to limit a peak value of current through the power switch responsively to a first value of the output voltage that is greater than the regulated value; and
   changing a value of the soft-start reference signal responsively to a second value of the output voltage that is less than the regulated value.

17. The method of claim 16 wherein forming the soft-start reference signal to limit the peak value of current through the power switch responsively to the first value of the output voltage that is greater than the regulated value includes using the soft-start reference signal to control the drive signal to limit the peak value of current through the power switch.

18. The method of claim 16 wherein changing the value of the soft-start reference signal responsively to the second value of the output voltage includes coupling a voltage source to the soft-start reference signal.

19. The method of claim 18 wherein coupling the voltage source to the soft-start reference signal includes comparing a signal representative of the output voltage to a first reference signal and enabling a switch to couple the voltage source to the soft-start reference signal.

20. The method of claim 16 wherein changing the value of the soft-start reference signal responsively to the second value of the output voltage includes increasing the value of the soft-start reference signal.

* * * * *